April 28, 1953
J. R. DAVEY
2,636,942
HUB TELEGRAPH REPEATER
Filed July 5, 1951
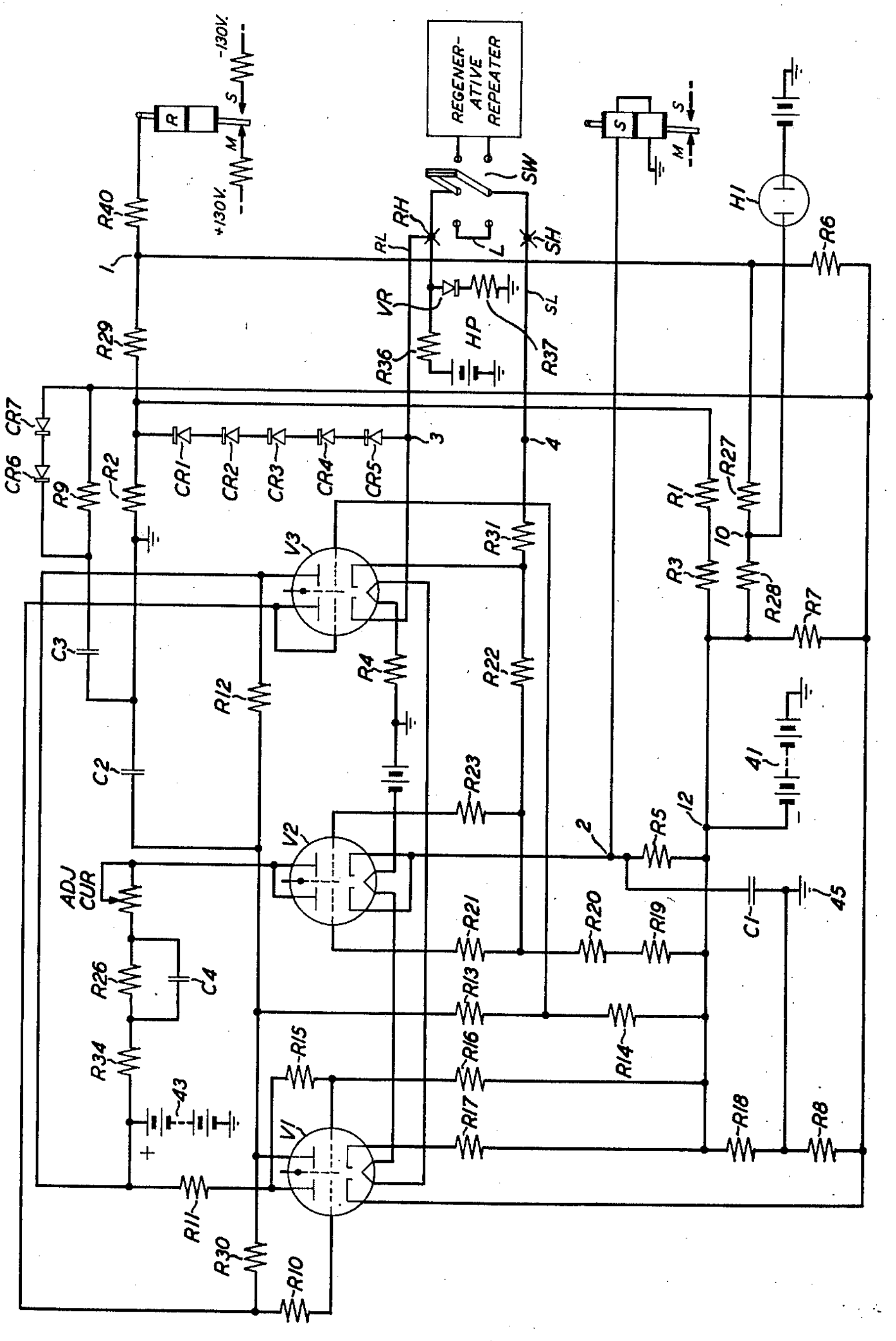
INVENTOR
J. R. DAVEY
BY John E. Cassidy
ATTORNEY Patented Apr. 28, 1953

2,636,942

UNITED STATES PATENT OFFICE 2,636,942

HUB TELEGRAPH REPEATER

James R. Davey, Franklin Township, Somerset County, N. J., assignor to Bell Telephone Laboratories, Incorporated, New York, N. Y., a corporation of New York Application July 5, 1951, Serial No. 235,118

5 Claims. (Cl. 178—73)

The present invention is an improved telegraph repeater and more particularly an improved hub-type telegraph repeater. Hub-type telegraph repeaters are well known in the art. They are direct-current, or impulse-type, repeaters, each of which is arranged so that it may be connected through a common electrical point to a number, such as three to ten or more of similar repeaters, and when so arranged any one of the individual hub repeaters may transmit through the hub to all of the others simultaneously. As thus arranged communication signals may be transmitted by only one of the repeaters effectively through the hub one at a time. A group of individual hub-type repeaters so interconnected constitute therefor essentially a half-duplex system in that only one message signal may be transmitted through the single hub at any one time. There are special arrangements which afford full-duplex operation. In a half-duplex hub-type repeater it is necessary to provide a directional control feature which controls the flow of signals outward from the hub.

As the number of individual hub repeaters connected to a single hub are increased and the capacity of the cabling connected to the hub is correspondingly increased, the signal transitions produced at the hub become rounded. This rounding of the transitions at the hub impairs the operation of the directional control unless corrective means are provided.

A feature of the invention is a non-linear wave-shaping network connected to the directional control circuit to compensate for the effect of the increased capacitance of the cabling, when numerous hub repeaters are connected to a hub.

These and other features of the invention will become apparent from a consideration of the following description when read with reference to the associated drawing which discloses a preferred embodiment in which the invention is presently incorporated. It is to be understood, however, that the invention is not limited to the present embodiment but may be incorporated in a number of different embodiments which will be suggested by the following to those skilled in the art.

In the drawing a portion of a relay-type repeater comprising a receiving relay R and a sending relay S is shown at the right. This repeater is arranged for hub operation by means of an electronic coupling unit, otherwise known as an electronic control circuit, through which the relay repeater is extended to the receiving hub RH and the sending hub SH shown at the middle right of the drawing.

A number of hub repeaters such as three or ten or more or less will ordinarily be connected through its own individual electronic coupling unit to the receiving and sending hubs. These other connections are indicated by the spurs radiating from the receiving hub RH and the sending hub SH. The receiving hub RH and the sending hub SH are each connected to an individual blade on the double-pole, double-throw switch SW. If regeneration is required the switch SW is actuated to the right to interconnect a regenerative repeater between the receiving and sending hub. If regeneration is not required the switch SW is actuated to the left to interconnect the sending and receiving hubs through the connecting link L.

In the following description where values of constants are given, such as the magnitude of resistances, potentials, etc., it is to be understood that the values cited are by way of example as an aid in understanding the operation of the system of the invention, but operation is not limited to the cited constants.

The receiving hub RH is connected to a hub potentiometer HP which comprises a circuit extending from positive battery through resistor R36, rectifier VR and resistor R37 to ground. The function of the hub potentiometer HP is to aid in obtaining suitable potential swings on the hub so as to insure satisfactory operation.

In transmission inward to the hub point, the coupling unit converts ±130 volt polar signals from the receiving relay R of the associated line or loop repeater to the voltage signals used on the receiving hub. In transmission outward from the hub point the coupling unit converts the voltage signals of the send hub to a polar-current signal which drives the sending relay of the associated line or loop repeater.

When used in a half-duplex circuit, the coupling unit performs a duplexing function by preventing the associated repeater from receiving, from the sending hub, signals which it itself originated. When used in a full-duplex circuit, this duplexing feature is prevented from functioning by use of a different type of connection to the hub point. No duplex control lead is required that is to say that no conductor is required to be extended from a telegraph switchboard, to control a relay, for instance, to switch elements in the circuit so that it is adapted for full-duplex or half-duplex operation.

In half-duplex service the coupling unit recognizes the occurrence of a "double space," that is, a simultaneous spacing condition from two telegraph facilities connected to the same concentration group and during any interval while such a condition exists the duplexing feature, that is the blocking of the sending leg of a repeater which is transmitting toward the hub, is disabled, allowing a space to be sent out on all the connected line facilities including those sending the spaces. This is beneficial in obtaining a fast break and in insuring an indication of simultaneous sending in a large half-duplex network.

TRANSMISSION INWARD TO HUB

*Marking condition*

In the marking condition, as shown, the receiving relay R of the connecting line or loop repeater applies +130 volts from its marking contact M through its armature and the receiving leg resistance R40, of 250 ohms, to terminal 1 of the coupling unit. The network consisting of resistors R29, R1, R2 and R3 reduces this marking voltage to a value of about +65 volts at the connection to the varistor string CR1 to CR5. Terminal 3 of the coupling unit connects to the receiving hub RH which is terminated in the hub potentiometer HP. This potentiometer has an impedance of 2460 ohms and provides a voltage of +60 volts. A voltage of about 5 volts is thus applied across the varistor string CR1 to CR5 in the reverse direction during a marking condition. The varistors have a very high resistance in this condition and the receiving relay of the line or loop repeater is effectively isolated from the hub potentiometer. The marking voltage on the receiving hub is therefore +60 volts as determined by the hub potentiometer.

*Spacing condition*

In the spacing condition the armature of the receiving relay of the line or loop repeater applies —130 volts through its spacing contact S, and resistor R40 to terminal 1 of the coupling unit. The network consisting of resistors R29, R1, R2 and R3 reduces this voltage to an open circuit value of —105 volts at the connection to the varistor string CR1 to CR5, The varistor string thus has a voltage across it in the forward direction and it assumes a resistance of about 500 ohms. In this spacing condition terminal 3 of the coupling unit appears to the hub potentiometer HP as a —105 volt source of potential having a resistance of about 2500 ohms. This causes current to flow from the hub potentiometer HP toward the coupling unit and the hub potential falls in a negative direction from +60 volts to below zero. The hub potentiometer has a varistor VR inserted in the branch to ground so that for hub voltages below zero the potentiometer appears as a 5333-ohm resistance to +130 volts. This results in a final spacing condition of 30 milliamperes flowing from the hub toward the coupling unit and a receiving hub potential of —30 volts. Other coupling units connecting to the same hub potentiometer but with their associated line or loop repeaters sending a mark toward the hub have no appreciable effect on the —30 volt spacing potential because of the high resistance of their CR1 to CR5 varistor strings.

*Double space condition*

If two coupling units each apply a spacing condition to a receiving hub, the effect of the two —105 volt 2500-ohm sources in parallel causes the hub potential to fall to a value of —60 volts. In this case each coupling unit draws about 18 milliamperes from the hub potentiometer.

*Hit indication*

The circuit includes a connection to a neon lamp HI for hit indication purposes. The plus and minus voltages from the line or loop repeater which appear at terminal 1 of the coupling unit are coupled to lamp HI via potentiometer R27—R28. This gives a marking voltage of about —50 volts and a spacing voltage of about —125 volts at terminal 10 on the lamp lead. By connecting the right-hand terminal of the neon lamp HI to —24 volt battery, a marking voltage of about 26 volts and a spacing voltage of about 100 volts is applied across the lamp. Only the spacing voltage is sufficient to ionize the lamp so that a visible indication of an incoming space is obtained. This feature may be used for hit detection or as an aid in locating spacing circuit legs in a concentration group.

TRANSMISSION OUTWARD FROH HUB

If no regenerative repeater is connected between the receiving and sending hub multiples, the two multiples are connected directly together through switch SW and link L. When a regenerative repeater is inserted in place of link L it produces voltages on the sending hub of +60 mark and —30 space with no double space condition existing.

*Marking condition*

During a mark, a +60 volt potential is applied to terminal 4 of the coupling unit from the sending hub. As will be explained later, when transmission is to be allowed to pass outward from the sending hub, the potential at the junction of resistors R13 and R14 is about —50 volts. This voltage applied to the right grid of double triode vacuum tube V3 causes its right cathode to appear as an open circuit for voltages more positive than about —40 volts. The +60 volts on the send hub is applied through the potentiometer string formed by resistors R31, R22, R20 and R19 to —130 volt source 41. At the junction of R22 and R20 a marking voltage of +50 volts is applied to the grids of double triode vacuum tube V2 through resistors R23 and R21, respectively. Both triode sections of tube V2 are thus held conducting and plate current flows from +130 volt source 43 via resistors R34, R26 and ADJ CUR rheostat, through the triode sections and then through the windings of the sending relay, such as relay S, in the connecting line or loop repeaters to ground. Resistors R23 and R21 prevent high frequency parasitic oscillations of tube V2. The ADJ CUR rheostat is adjusted to give a total plate curent of 14 milliamperes. Resistor R5 connecting from terminal 2 to —130 volt source 41 provides 7.0 milliamperes of spacing bias current to the sending relays, such as relay S, in the line or loop repeaters. The sending relays are thus held marking with a nut current of 7.0 milliamperes.

*Spacing condition*

During a spacing condition a —30 volt potential is applied to terminal 4 from the sending hub. A —30 volt potential is thus applied through potentiometer string formed by resistors R31, R22, R20 and R19 to —130 volt source 41. A potential at the junction of R22 and R20 of —35 volts is applied to grids of tube V2 via resistors R23 and R21, respectively. This maintains tube V2 in a cut-off condition. With zero plate current, the sending relay, such as relay S, in the connecting line or loop repeaters is held spacing by the 7.0 milliamperes of bias current flowing through resistor R5. The sending relay of the associated repeater is thus driven by a polar current of ±7.0 milliamperes. Capacitor C1 connected across the winding of relay S to ground lowers the higher frequency impedance of the windings and prevents the transient voltages developed across the winding from being great enough to interfere with the grid control of tube V2 when driven by a +50, −35 volt signal. Capacitor C4 aids in producing a symmetrical wave form through the relay windings.

DUPLEX CONTROL AND DOUBLE SPACE RECOGNITION

Vacuum tube V1 is connected as a "flip-flop" or "trigger" circuit arranged to recognize the direction of transmission through the coupling unit and to recognize the occurrence of a double space condition on the receiving hub. The "flip-flop" is controlled by two input voltages, one obtained from the receiving relay R and the other from the receiving hub RH. The input from the receiving relay R of the associated repeater, which appears on terminal 1, is connected to the left cathode of tube V1 via the network consisting of resistors R6, R7, the upper terminal of which is connected to negative battery source 41, and R8 the upper terminal of which is connected to ground 45. The voltage on the receiving hub, appearing on terminal 2, is connected to the left grid of tube V1 via the left half of tube V3, connected as a diode, and resistor R10.

With the receiving relay R of the associated repeater in a marking condition, the left cathode of tube V1 is held at a potential of +20 volts by the network consisting of resistors R6, R7 and R8. With the receiving hub RH also in a markink condition tube V1 may stand either with the left side conducting and the right side cut off, or vice versa, depending upon the direction of transmission of the last spacing signal.

*Inward transmission to the hub*

When the armature of the receiving relay R of the associated repeater operates to space, the potential of the left cathode of tube V1 is lowered to −45 volts by the coupling network consisting of resistors R6, R7, R8. At the same time, the receiving hub potential falls to −30 volts. This −30 volt potential is applied through the left side of tube V3 and through resistor R10 to the left grid of tube V1 and holds its left triode section in a conducting condition, since the left cathode is at −45 volts and the left grid is at −30 volts. The plate of the left section of tube V1 is coupled to the grid of the right section by the potentiometer consisting of resistors R15 and R16. Thus with the left section in a conducting condition, the right section is held cut off. This causes the plate of the right section to have a potential near +130 volts. The plate of the right section of tube F1 is coupled to the grid of the right section of tube V3 by means of the potentiometer consisting of resistor R13 and R14. This potentiometer impresses a voltage of about +20 volts on this grid during the spacing interval being described. This results in the right cathode of tube V3 appearing as a low resistance source of about +25 volts for all impressed voltages more negative than +25. When the spacing condition of −30 volts reaches terminal 4 of the coupling unit from the sending hub, the right cathode of tube V3 remains at a voltage of about +25 and prevents the space signal from cutting off tube V2.

The sending relay in the associated repeater is therefore prevented from receiving the space which was originated by the receiving relay of the same repeater.

When the armature of the receiving relay R of the associated repeater returns to a marking condition, the cathode of the left section of tube V1 returns to +20 volts and the receiving hub potential returns to +60 volts. With the receiving hub at +60 volts and the right plate of tube V1 near +30 volts a potential of about +60 is applied to the left grid of tube V1 through resistor R10. This maintains the left section of tube V1 in a conducting state, since the cathode is at +20 volts and the grid is driven from +60 volts. Thus, for transmission inward to the hub, the right cathode of tube V3 continuously holds the potential applied through resistor R22 to tube V2 at a value near +25 volts and prevents any spacing intervals from being repeated back to the sending relay of the repeater originating the transmission. It is necessary that this "hold" condition be applied continuously and not just during the duration of the space on the receiving hub, because the insertion of a regenerative repeater between the receiving and sending hubs causes the spacing intervals to appear at the sending hub after a delay of at least one-half unit pulse. Therefore, a space on the sending hub must, at times, be blocked from reaching tube V2 when the receiving hub is marking. Capacitor C2 serves to slow the "flip-flop" action of tube V1 so as to prevent its operation on transient conditions of very short duration. Capacitor C3 in series with the combination of varistors CR6 and CR7 and resistor R9 is connected between the left cathode of tube V1 and ground. This causes the mark-to-space transition of the cathode to occur more rapidly than the space-to-mark transition which is necessary when the hub wave form is rounded by the capacitance to ground of the connecting switchboard cables. This is an important aspect of the present invention.

*Outward transmission from another connecting repeater*

When a spacing potential is produced on the receiving hub RH by some other connecting repeater, a potential near to −30 volts is applied through the left half of tube V3 and resistor R10 to the left grid of tube V1 in the same manner as described for inward transmission. However, since the receiving relay of the associated repeater remains marking, the cathode of the left section of tube V1 remains at +20 volts. This results in the left section being cut off and the right section conducting. The cathode of the right section is held at a potential of about −44 volts by potentiometer R17—R18 so that the potential at the right plate falls to about zero or slightly negative. When the receiving hub returns to the marking condition of +60 volts, the diode-connected left-hand side of tube V3 is nonconducting and the near zero potential at the right plate of tube V1 is applied through resistors R30 and R10 to the left grid of tube V1. With the cathode of the left section at +20 volts and the grid near zero volts, the left section of tube V1 remains cut off during the marking interval following a space sent from some other repeater.

For periods of outward transmission, the plate of the right section of tube V1 thus remains continuously at a potential near zero. This causes the coupling potentiometer string R13 and R14 to apply a voltage to the right grid of tube V3 of about −50 volts. This makes the right cathode of tube V3 appear as an open circuit for both the +60 volt mark and the −30 volt space conditions. Thus spaces are able to reach the grids of tube V2 and operate the sending relay of the associated repeater. When the double-space condition of −60 volts appears on the sending hub the right cathode of tube V3 does not become more negative than about −40 volts.

*Double-space condition*

When the double-space condition of −60 volts occurs on the receiving hub, this potential is applied through the left side of tube V3 and resistor R10 to the left grid of tube V1. This causes the left section of tube V1 to cut off even if the cathode is at the spacing condition of −45 volts. Thus the −30 volt or −60 volt double-space condition on the sending hub, depending upon whether or not a regenerative repeater is used, is allowed to pass to tube V2 and operate the armature of the sending relay of the associated repeater to space. Thus when no regenerative repeater is used, a space may be immediately received from another repeater connected to the same hub even though the associated repeater be at the time transmitting a space toward the hub. Any two repeaters connected to the same hub are thus essentially provided full duplex transmission by the combination of the three-condition hub and the duplexing feature of the coupling units. This is sometimes called a double-space by-pass feature since it allows two space signals traveling in opposite directions to pass each other at a half-duplex concentration group. This is in contrast with the usual break feature previously employed wherein the space first to reach a half-duplex switching point blocks the transmission of a space in the opposite direction for the duration of the first space.

TRANSMISSION OF A BREAK SIGNAL

When no regenerative repeater is used a break signal is transmitted through the hub point without delay as a single or a double space.

When a regenerative repeater is used, the break will be subjected to a delay of one-half a unit pulse if the regenerative repeater is in an idle condition. If the break arrives during a selection cycle of the regenerative repeater when a space-to-mark selection has just been made, the break may be subjected to a delay approaching a full unit pulse. If the arrival of the break occurs when the regenerative repeater has a spacing output then the break is passed on without delay.

What is claimed is:

1. In a hub-type telegraph repeater coupling unit, a space discharge device forming one of the elements of a flip-flop circuit, a cathode in said device, and a circuit extending from said cathode directly to a wave-shaping network, said network comprising a lumped capacitance and a polarity sensitive resistor in series with said capacitance.

2. In a hub telegraph system, a hub, a receiving relay, an electronic coupling unit interconnecting said relay and said hub, a flip-flop circuit in said unit, a space discharge device in said circuit, a grid in said device connected to and controlled by said hub, a cathode in said device connected to and controlled by an armature of said relay, differing amounts of capacitance connectable to said hub at different times and a wave-shaping network connected to said cathode so as to maintain said device continuously in a single condition while said relay is transmitting toward said hub notwithstanding the effect on said grid of said differing amounts of capacitance.

3. In a hub telegraph system, a hub, a flip-flop circuit, a space discharge device in said circuit having a first element connected to a source of incoming telegraph signals, and a second element connected to said hub, differing amounts of capacitance connectable through said hub to said second element at different times, tending to affect the potential relationship of said elements in response to signals impressed by said source on said device and said hub and a wave-shaping network connected to one of said elements to maintain said potential relationships constant notwithstanding said differing amounts of capacitance, said network comprising a polarity sensitive resistor in series with a lumped capacitance.

4. In a telegraph system, a telegraph signal receiving source connected to a hub, an electronic coupling unit for controlling the direction of telegraph transmission through an individual sending path connected to said hub, a flip-flop circuit in said unit, a space discharge device in said circuit, an input circuit in said device comprising a first element connected to said source and a second element connected to said hub, and a wave-shaping network connected to one of said elements to maintain a substantially constant potential relationship between said elements incident to signaling from said source toward said hub and incident to varying amounts of capacitance connected to asid hub at different times, said network comprising a first resistor in series with a lumped capacitance and a polarity sensitive resistor shunting said first resistor.

5. In a hub telegraph system, a hub, a hub-type telegraph repeater comprising an electronic coupling unit connected to said hub, flip-flop circuit in said unit, said circuit having a first and a second space discharge device, said devices having the output circuit of each connected through an individual resistor to the input circuit of the other, the input circuit of said first device connected to said hub and a circuit branch extending from the output of said second device directly through a lumped capacitance to ground to prevent response to transient conditions of short duration.

JAMES R. DAVEY.

References Cited in the file of this patent

UNITED STATES PATENTS

| Number | Name | Date |
|---|---|---|
| 2,542,208 | Purvis | Feb. 20, 1951 |
| 2,553,978 | Neiswinter | May 22, 1951 |